United States Patent
Leitner

(10) Patent No.: US 8,672,205 B2
(45) Date of Patent: Mar. 18, 2014

(54) NAILING DEVICE WITH NAIL COIL STABILIZING MECHANISM

(76) Inventor: Helmut Leitner, Leopoldsdorf (AT)

(*) Notice: Subject to any disclaimer, the term of this patent is extended or adjusted under 35 U.S.C. 154(b) by 719 days.

(21) Appl. No.: 12/377,852

(22) PCT Filed: Aug. 16, 2007

(86) PCT No.: PCT/AT2007/000394
§ 371 (c)(1), (2), (4) Date: Jul. 29, 2010

(87) PCT Pub. No.: WO2008/019418
PCT Pub. Date: Feb. 21, 2008

(65) Prior Publication Data
US 2010/0320251 A1    Dec. 23, 2010

(30) Foreign Application Priority Data

Aug. 16, 2006  (AT) ................ GM619/2006

(51) Int. Cl.
*B25C 5/02* (2006.01)
*B25C 5/06* (2006.01)

(52) U.S. Cl.
USPC ........................................ 227/113

(58) Field of Classification Search
USPC .................. 227/107–113, 119–120, 131
See application file for complete search history.

(56) References Cited

U.S. PATENT DOCUMENTS

| | | | |
|---|---|---|---|
| 3,104,395 A | 9/1963 | Grey, Jr. et al. | |
| 3,930,299 A * | 1/1976 | Farrington et al. | 29/432 |
| 4,096,982 A | 6/1978 | Stahl | |
| 4,491,261 A * | 1/1985 | Mitsuhashi | 227/76 |
| 4,616,774 A * | 10/1986 | Yasuda | 227/113 |
| 4,775,089 A * | 10/1988 | MacDonald | 227/2 |
| 4,784,306 A * | 11/1988 | Baum | 227/113 |
| 5,199,627 A * | 4/1993 | Christensen | 227/130 |
| 5,687,899 A * | 11/1997 | Dohi et al. | 227/10 |
| 5,709,332 A * | 1/1998 | Coop | 227/66 |
| 5,813,588 A * | 9/1998 | Lin | 227/109 |
| 5,856,715 A * | 1/1999 | Peot et al. | 310/50 |
| 5,862,970 A * | 1/1999 | Cougar | 227/130 |
| 5,904,285 A * | 5/1999 | Anderson et al. | 227/115 |
| 5,979,516 A * | 11/1999 | Grant | 141/331 |
| 6,041,992 A * | 3/2000 | Poinelli et al. | 227/130 |
| 6,099,542 A * | 8/2000 | Cohn et al. | 606/167 |
| 6,349,868 B1 * | 2/2002 | Mattingly et al. | 227/134 |
| 6,431,427 B1 * | 8/2002 | Leitner | 227/119 |
| 6,443,348 B2 * | 9/2002 | Lamb | 227/8 |
| 6,557,703 B1 | 5/2003 | Leitner | |
| 6,662,990 B1 * | 12/2003 | Sun | 227/131 |
| 6,755,338 B2 * | 6/2004 | Hahnen et al. | 227/175.1 |

(Continued)

FOREIGN PATENT DOCUMENTS

| | | |
|---|---|---|
| DE | 9016493 U1 | 3/1991 |
| WO | 0056505 A1 | 9/2000 |

*Primary Examiner* — Robert Long
(74) *Attorney, Agent, or Firm* — Cahn & Samuels, LLP

(57) ABSTRACT

A nailing device includes a body with first and second ends and a handle attached to one of the first and second ends. A nail magazine is articulatably connected to the body, where the nail magazine is configured to receive a nail coil. The nail magazine includes an upper part that has a plurality of recesses and a lower part. In order to stabilize the nails in the nail coil, a plurality of magnets are disposed in the plurality of recesses of the upper part of the nail magazine.

16 Claims, 5 Drawing Sheets

(56) References Cited

U.S. PATENT DOCUMENTS

| | | | |
|---|---|---|---|
| 6,820,789 B2* | 11/2004 | Lipsky et al. | 227/120 |
| 6,851,594 B1* | 2/2005 | Huang | 227/109 |
| 6,896,135 B2 | 5/2005 | Leitner | |
| 6,948,647 B1* | 9/2005 | Niblett et al. | 227/130 |
| 6,957,757 B1* | 10/2005 | Huang | 227/137 |
| 6,966,476 B2* | 11/2005 | Jalbert et al. | 227/8 |
| 6,991,146 B2* | 1/2006 | Sinisi et al. | 227/134 |
| 7,165,956 B2* | 1/2007 | Santais et al. | 425/3 |
| 7,210,607 B2* | 5/2007 | Niblett et al. | 227/130 |
| 7,357,286 B2* | 4/2008 | Kubo et al. | 227/119 |
| 7,690,974 B2* | 4/2010 | Johnson | 460/117 |
| 2002/0050506 A1 | 5/2002 | Hadfield | |
| 2007/0114259 A1* | 5/2007 | Bromley et al. | 227/120 |
| 2008/0067089 A1* | 3/2008 | Zhu | 206/340 |
| 2008/0149682 A1* | 6/2008 | Uhm | 227/120 |
| 2008/0190987 A1 | 8/2008 | Huang | 227/109 |
| 2009/0026244 A1* | 1/2009 | Huang | 227/119 |
| 2009/0209950 A1* | 8/2009 | Starksen | 606/21 |
| 2009/0256334 A1* | 10/2009 | Handel | 280/612 |
| 2011/0049215 A1* | 3/2011 | McAfee et al. | 227/137 |
| 2012/0104057 A1* | 5/2012 | Gerrior | 224/183 |

* cited by examiner

NAILING DEVICE WITH NAIL COIL STABILIZING MECHANISM

The invention relates to a nailer for nails which are belted in the form of a coil via at least one wire, with the heads of which partially overlapping each other, said device comprising an upper part, which is designed as hammer handle at its one end and has an angular stop at its other end, and comprising a lever part, which is connected to the upper part in an articulated manner and includes a nail magazine, a hammerhead and a nail-feeding or guiding means, wherein the hammerhead has a drive channel in which a striker is guided, and wherein the nail-feeding or guiding means has a rocker arm which is set on a shaft on the hammerhead and which, upon activation of the nailer, displaces a feeder with at least one feed claw in an opening in the hammerhead, and in the relaxed state of the nailer, the upper part and the lever part are forced apart by a resilient element as far as to a stop.

An example of such a nailer is known from WO 00/56505.

Such nailers work perfectly as long as still a number of nails are belted on the coil, since at the beginning of the uncoiling of the coil, the nail tips of the nails of the coil lying radially outwards directly adjoin a lower part of the nail magazine. When using a nailer, that is, when applying striking force, accordingly, these nails are hardly put into movement since they are arranged to adjoin the lower part of the magazine anyway. Yet, if only a smaller number of about 20 nails or less is present, the distance to the lower part of the magazine will continuously be increasing. The increase in the distance to the lower part of the magazine causes an increase of the freedom of movement for the nails such that the wire connections of the nail coil will be stressed when the impact force is being applied, often leading to nails getting stuck.

In order to guide the nails in the nail magazine better, it has also already been known to provide a winding core within the coil so as to absorb the forces occurring during nailing in the direction of the lower part of the magazine. Yet, providing such a winding core involves that drawback that the winding core often is removed when exchanging the nail coil so that it will be not ensured that the nails will still be stabilized in the nail magazine after a new nail coil has been inserted.

Furthermore, an automatic nailer has been known from U.S. Pat. No. 3,104,395 A1 which is pneumatically and/or liquid-pressure operated. A piston and a nail-driving ram attached thereto transfer the exerted pressure to a nail which is precisely oriented through upper and lower recirculating ball elements partly projecting into the bore of the nail-holding compartment. A magnet attracts the nail so that the nail will get into a position substantially in the center of the bore. Yet, no stabilization of the nails in their belted position within the nail magazine is reached here.

From DE 90 16 493 U1 a nail-driving tool has been known which transfers nails stored in a magazine subsequently into a drive-out channel. In order to prevent the nails from falling down before the drive-out process will be started, and to transfer the last nail of a nail strip or coil into the drive-out channel, a magnet is provided on the side opposing the inlet opening, fixing the nails laterally. However, no stabilization of the nail coil in the nail magazine is reached here either.

A different, automatic dispenser for several nails with a container has been known from U.S. Pat. No. 4,096,982 A1, wherein the nails are not provided in the form of a belted coil but a number of nail strips or rows is stored. The pressure exerted on a head member of a ram causes the foremost nail of a strip to be detached and introduced into the working surface. The dispenser comprises a wedge plate with a magnet via which a separate nail row is pushed forwards. A further magnet is provided in the region of the dispense channel, said foremost nail being attracted into the dispense channel by said magnet.

However, the object of the present invention is to stabilize the nails of the nail coil received in the nail magazine against the striking forces that occur during nailing, in particular also if there is only a small number of nails left in the nail coil, so as to prevent the nails from getting stuck.

In the nailer of the initially defined type, this is achieved in that at least one stabilizing element is assigned to the nail magazine via which the nails are stabilized in their belted position by magnetic force. Providing a stabilizing element which is assigned to the nail magazine and via which the nails are reliably held in a predetermined belted position fixedly oriented relative to each other allows for reliably preventing the nails from getting stuck and/or from crossing in the nail magazine. Here, advantageously when inserting a new nail coil, the user of the nailer does not have to insert an additional stabilizing device, e.g. a winding cylinder, since the stabilizing element is assigned to the nail magazine anyway. Accordingly, the nails are reliably prevented from getting stuck even if only a small number of nails is left in the nail magazine.

A structurally simple way of stabilizing the nails in their belted position by means of magnetic force consists in providing an upper part of the magazine arranged adjacent the nail heads of the nail coil with at least one permanent magnet as a stabilizing element.

In order to apply the magnetic force to the nails across the whole periphery of the nail magazine in a manner as even as possible, it is advantageous if several permanent magnets are provided in the upper part of the magazine which are preferably arranged to be peripherally-distributed in an even manner.

If the upper part of the magazine comprises recesses for receiving the permanent magnets, the permanent magnets can easily be kept in a positive locking within the upper part of the magazine.

In order to prevent indentations on the inner side of the upper part of the magazine facing the nail heads which could hamper the uncoiling of the nail coil and thus lead to a blocked nail magazine, it is beneficial if the upper part of the magazine has a fixing plate with at least two layers, wherein one layer facing the nail heads consists of a material which is harder than that of the other layer(s).

If the layer facing the nail heads consists of a non-magnetizable steel, e.g. austenite, the inner side of the upper part of the magazine facing the nail heads is harder than the nail heads themselves so that indentations are reliably prevented. Moreover, providing a non-magnetizable steel prevents the course of the magnetic field from being hampered, as would be the case with an non-alloyed steel sheet, e.g.

In order to as little as possible attenuate the magnetic force of the permanent magnets acting on the nails, it is beneficial if the recesses are provided in the second layer, which preferably consists of synthetic material, in particular polyamide, for receiving the permanent magnets so that the permanent magnets rest directly on the lower layer.

In order to generate a magnetic field which reliably stabilizes the nails in their predetermined belted position oriented relative to each other, it is beneficial if the permanent magnets consist of neodymium-iron-boron alloy. Tests have shown that it is particularly useful if the permanent magnets have a holding power of between 10 N/mm$^2$ and 30 N/mm$^2$, preferably of substantially 20 N/mm$^2$. In order to not needlessly increase the weight of the nailer and to nevertheless generate a sufficiently strong magnetic field, it is advantageous if the permanent magnets are designed to be cylindrical and preferably have a diameter of between 5 mm and 15 mm, in particular of about 10 mm, and have a height of between 1 mm and 3 mm, in particular of about 2 mm.

In order to prevent the nails, in particular the last nail, from being ejected from the drive channel in a transverse manner since the last nail of a nail coil—because of a lacking guide—tends to take a transverse position due to the connection with a number of other nails, it is beneficial if the striker comprises a magnetic material at least in a front bearing area. The nail head is thereby automatically oriented relative to the bearing area of the striker so that the nail will be oriented in the drive channel after having entered the active field of the magnetic material of the striker.

In order to prevent the nails from getting stuck due to an interconnection, it is beneficial if belted nails are interconnected via two wires, wherein the wires preferably have a strength of between 510 N/mm$^2$ and 610 N/mm$^2$, preferably of substantially 560 N/mm$^2$.

In the following, the invention will be explained in even more detail by way of a preferred exemplary embodiment illustrated in the drawings, yet without being restricted thereto. In detail, therein:

Figure 1:
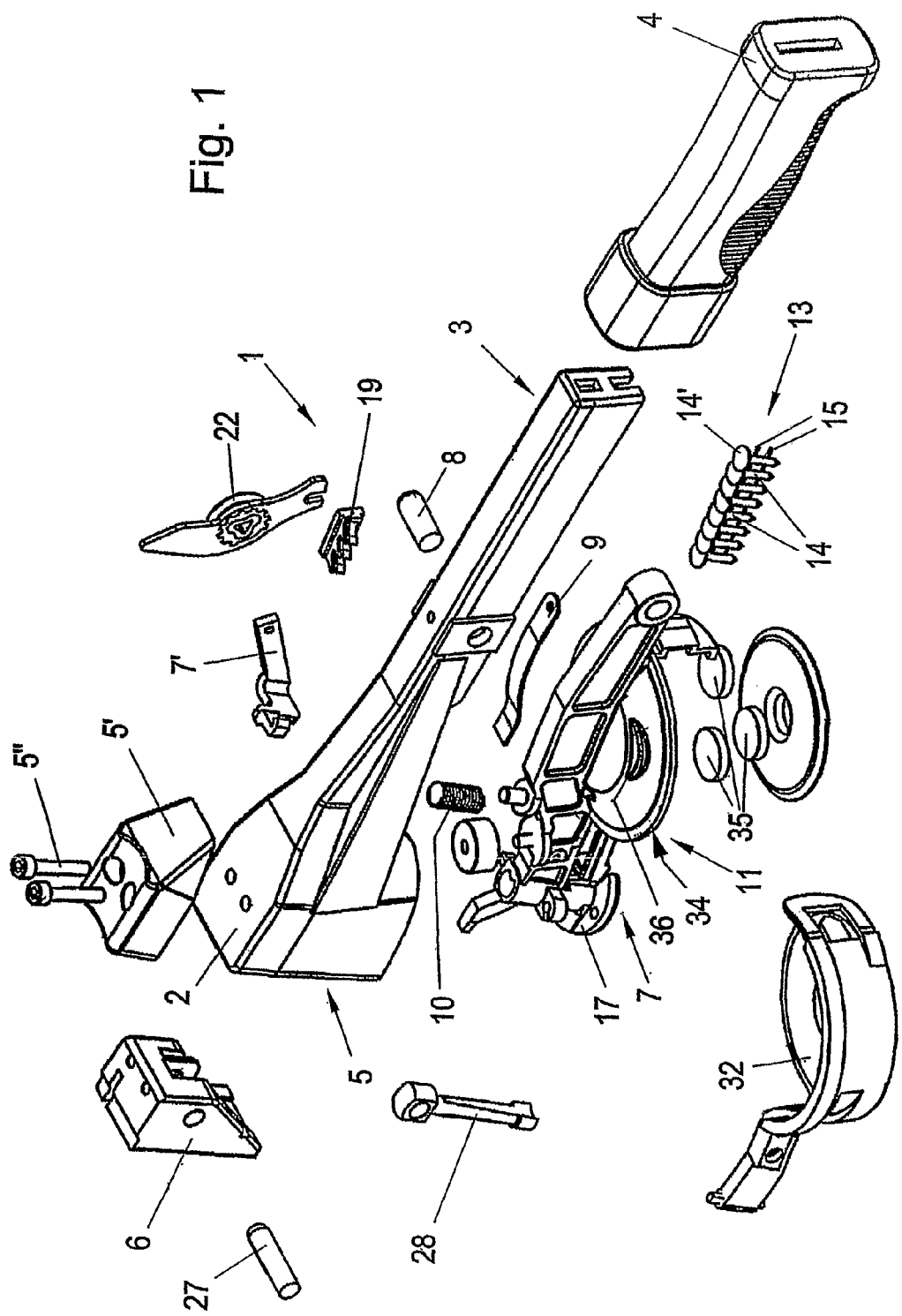
FIG. 1 shows an exploded perspective representation of a nailer.

In FIG. 1, the nailer 1 is shown with an upper part 2, with a hammer handle 4 being provided at its one end 3 and an angular stop 6 at its opposing end 5. A striker block 5' is attached to the upper side of the upper part 2 in the end region 5 via two screws 5".

A lever part 7 is articulated on the upper part 2, wherein an axle 8 has been received in the upper part 2 for this purpose. Furthermore, a connecting lever 7' can be seen. In order to keep the lever part 7 in a relaxed state in a position spaced-apart from the upper part 2, a leaf spring 9 as well as a coil spring 10 are provided.

The lever part 7 comprises a nail magazine 11, with a nail coil 13 being received therein which comprises a number of nails 14 with nail heads 14' belted via two connecting wires 15.

Figure 2:
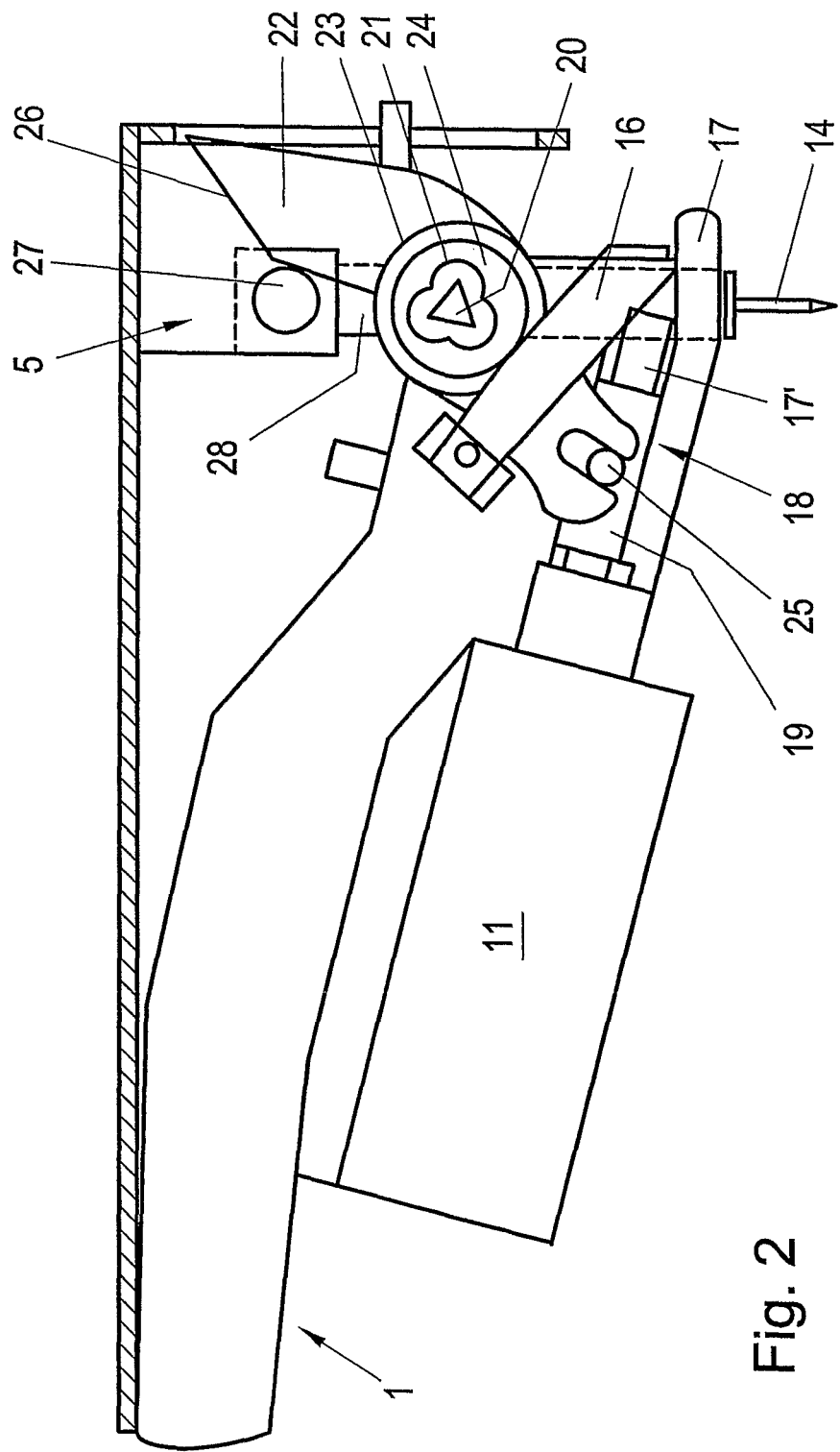
FIG. 2 shows a schematic representation of the nailer, in particular of the feeding or guiding means.
Figure 3:
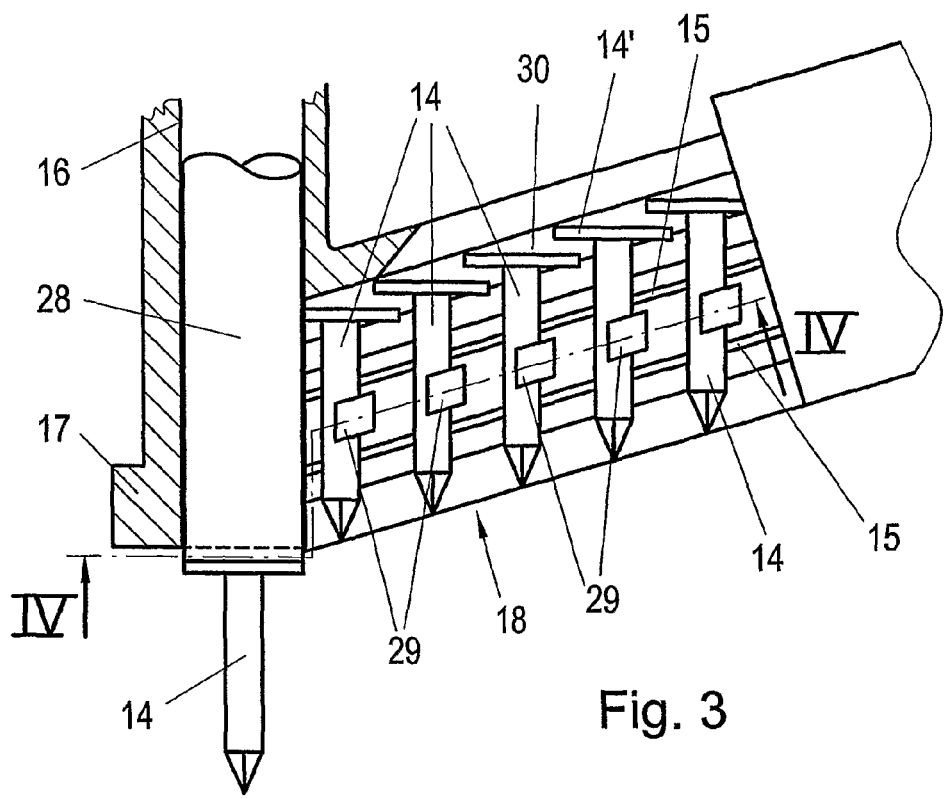
FIG. 3 shows a sectional representation of the drive channel as well as of the feeding or guiding means.
Figure 4:
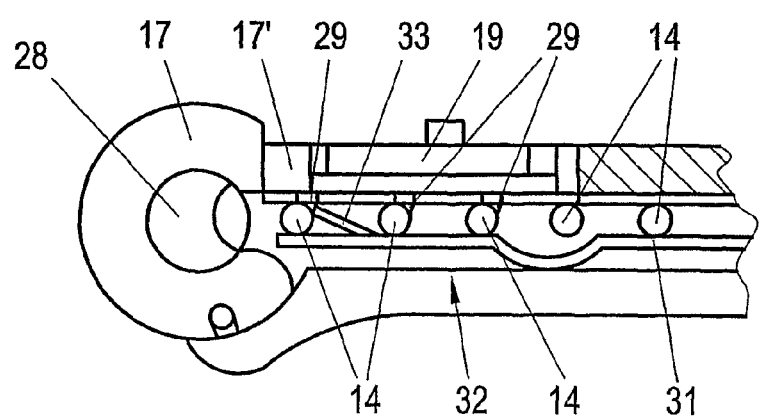
FIG. 4 shows a sectional representation along line IV-IV of FIG. 3.

The principle mode of operation of the nailer 1 can be seen in the schematic illustration of FIGS. 2 to 4. Here, it is shown that a nail 14 is discharged via a drive channel 16 and can be struck into a base by means of a hammerhead 17. An opening 17' is provided within the hammerhead 17 into which a feeder 19 of a feeding or guide device 18 has been displaceably inserted.

Furthermore, the hammerhead 17 is fixedly connected with a shaft 20 which is triangular in its cross-section, said shaft engaging in a star-shaped bushing 21 in a torque-proof manner and projecting through a recess in the rocker arm 22. The recess is delimited by an annular lug 23, and the region between the delimitation of the recess and the star-shaped bushing 21 as well as between the annular lug 23 and the bushing 21 is filled with rubber 24.

The rocker arm 22 is designed to be fork-shaped at one end and encompasses a bolt 25 by means of the fork, said bolt being fixedly connected with the feeder 19 so that the fork of the rocker arm 22 will displace the feeder 19 via the bolt 25 when the rocker arm 22 is being twisted. A contact surface 26 is provided at the end of the rocker arm 22 facing away from the feeder 19, said contact surface, upon activation of the nailer 1, sliding along the contact bolt 27 mounted on the angular stop 6, thus pivoting the rocker arm 22. At the same time, a striker 28 is mounted on the contact bolt 27.

As soon as the nailer has been actuated, the rocker arm 22 will be twisted against the resilient force of the rubber 24. After having finished nailing, the striker 28 will be lifted in the drive channel 16, and the rubber mass 24 under tension puts the rocker arm 22 back into a relaxed position. Here, the contact surface 26 of the rocker arm 22 slides back along the contact bolt 27, and the feeder 19 is put into its front position near the drive channel 16 in the hammerhead 17 so as to position the next nail in the drive channel 16.

In FIG. 2, the nailer is shown in that position in which a nail 14 is being driven in, i.e. the striker 28 mounted on the bearing bolt or, in the present case, on the contact bolt 27 is in its lowermost position in drive channel 16 and drives nail 14 present therein out of the device and into the material to be nailed. The feeder 19 has been pushed back by the rocker arm 22 in opening 18 of the hammerhead 17 via the bolt 25 so that neither the feeder 19 nor the feed claws 29 (cf. FIG. 3) attached thereto hinder the striker 28 when striking out the nail 14. The rubber 24 present between the star-shaped bushing 21 and the annular lug 23 as well as the recess of the rocker arm 22 located therebehind is tensioned in this position and provides for a return of the feeder 19 when the nailer 1 is load-released, the feed claws 29 provided on the feeder 19 guiding nails 14 towards the drive channel 16.

FIG. 3 illustrates the feeding means, viewed from the other side in detail. Also in this illustration, the striker 28 is in its lowermost position in the drive channel 16 in hammerhead 17. At this moment, nail 14 is driven into the material to be nailed. Shortly before driving-in of nail 14, which is located in drive channel 16, occurs, i.e. shortly before the striker 28 reaches its lowermost position in the drive channel 16, nail 14 is released by the feeder 19 being retracted, so that at the moment of driving-in, neither the front edge of the feeder 19 nor the foremost feed claw 29 project into the drive channel 16 so that the striker 28 will not be impeded when driving in the nail 14. The further nails 14 are connected to a coil or nail strip 13 by means of connecting wires 15, and the nail heads 14' are guided in a groove 30 which is provided at least in the hammerhead 17.

In FIG. 4, striker 28 can be seen in drive channel 16, the striker 28 being in its lowermost position in the drive channel 16, i.e., as in FIG. 3, that moment is illustrated in which a nail 14 has just been driven in and in which the nailer 1 has not yet been relaxed. The feeder 19 is held in the pushed-back position in opening 17' by the rocker arm 22 not illustrated here, via the bolt 25. The feed claws 29 are located behind the foremost three nails 14. From the other side, the nails 14 are guided in the region of their shafts by a retaining spring 31 which is fastened to the magazine lower part 32 and supported there. In the relaxed state of the nailer 1, the striker 28 moves upwards in the drive channel 16, the rocker arm 22 is returned by rubber 24 and pushes the feeder 19 and thus also the nail strip 13 with the nails 14 forwards so that the foremost nail 14 gets into the drive channel 16 and the nail 14 next thereto will be positioned in front of the retaining claw 33. When driving in the nail 14 present in drive channel 16, the feeder 19 is pushed back again, the retaining claw 33 preventing the nails 14 from being pulled back at the same time. The retaining spring 31 evades together with the nails 14 so that the feed claws 29 can be pulled towards the rear, past the nails 14.

Figure 5:
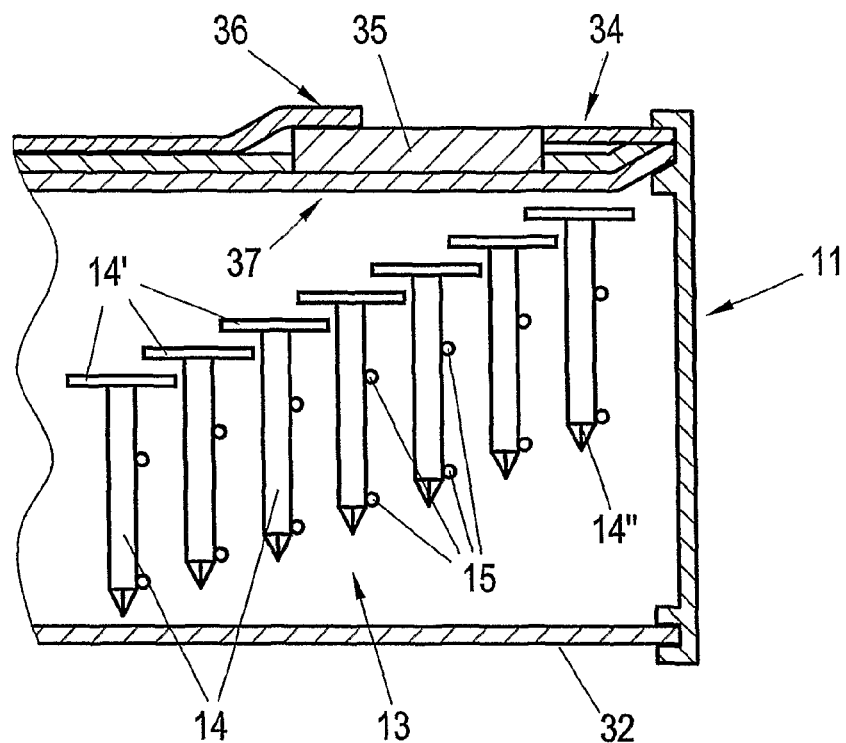
FIG. 5 shows a sectional representation of the nail magazine.

The forces released during the above-described striking process stress the connections between the wires 15 and the nails 14 (cf. FIG. 5). In particular, the stress is the higher the fewer nails 14 are still belted on the nail strip or coil 13 since the distance between the nail tips 14" to the lower part 32 of the magazine is continuously increasing when the nail coil 13 is being uncoiled. In order to delimit the freedom of movement of the nails 14 received in the nail magazine 11 and to stabilize the nails 14 in the nail magazine 11, three permanent magnets 35 are received in an upper part 34 of the magazine in the exemplary embodiment shown. Here, these are cylindrical flat magnets with dimensions of about 10×2 mm which will be received in the fits 36 in the upper part 34 of the magazine (cf. FIG. 1).

The three permanent magnets 35 shown in FIG. 1 are advantageously provided in case of a nailer 1 using nails 14 of a length of from 16 to 19 mm, with four permanent magnets 35 being advantageously provided in case of a nailer 1 using nails 14 of a length of from 22 to 25 mm.

Figure 6:
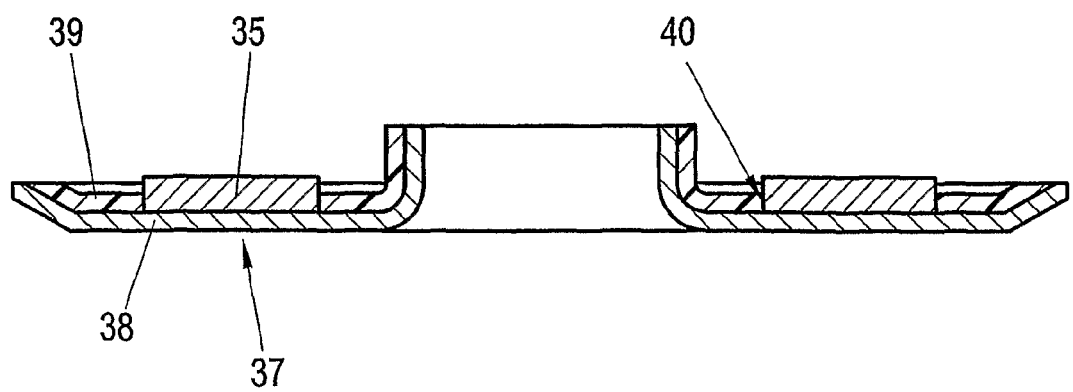
FIG. 6 shows a sectional representation of a fixing plate of the upper part of the magazine.

As is particularly visible in FIG. 6, a fixing plate 37 produced in a sandwich construction is provided for receiving the permanent magnets 35, said fixing plate comprising a lower layer 38 facing the nail heads 14' and made of non-magnetizable steel, and comprising an upper layer 39 made of synthetic material, in particular a polyamide synthetic material, having recesses 40 for receiving the permanent magnets 35. On the one hand, using a non-magnetizable steel for the layer 38 provides a sufficiently hard material that prevents the nail heads 14' from causing indentations on the surface facing the nail heads 14', which indentations could impede an unhindered uncoiling of the nail coil 13. On the other hand, the non-magnetizable steel material does not influence the course of the magnetic field of the permanent magnets 35.

Figure 7:
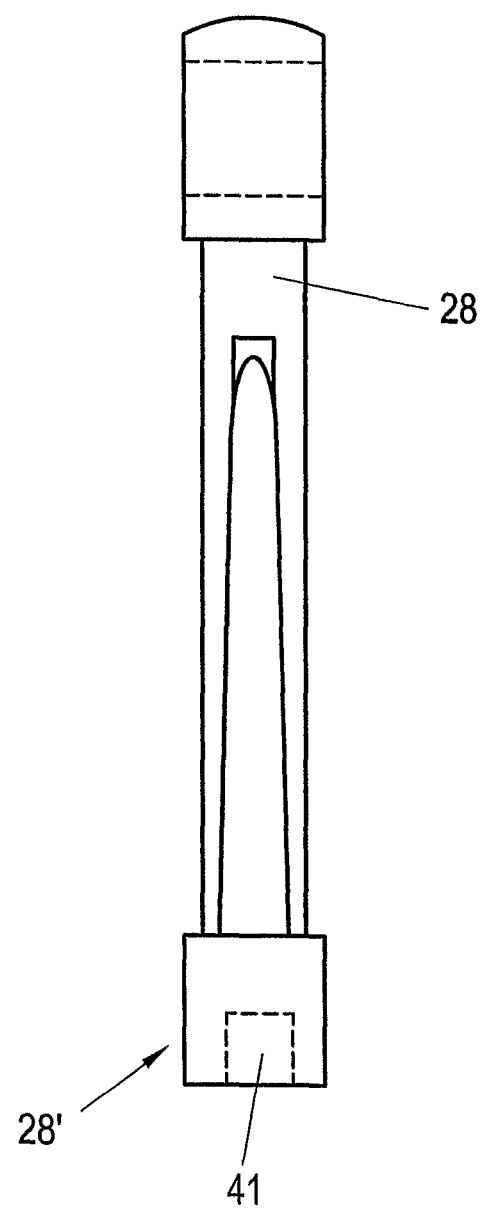
FIG. 7 shows a representation of the striker.

Finally, FIG. 7 shows the striker 28 in detail, wherein it is particularly visible that a permanent magnet 41 is attached to a front side 28' by means of press-fit. A last nail 14 of a nail coil 13 which often comes to rest in a transverse position due to the lacking guide and the belt-connection with further nails 14 in the drive channel 16 is automatically put into straight position by the permanent magnet 41 with its magnetic force when the striker 28 is being moved downwards, and is fixed by the magnetic force. Thus, an optimum nailing result on the fixing element is ensured also for the last nail.

What is substantial here is, however, that the nails 14 are stabilized within the nail magazine 11 by means of magnetic force so as to prevent the nails 14 from getting stuck, in particular in case that only a small number of nails 14 is left on the nail coil 13.

The invention claimed is:

1. A nailing device comprising:
a body having first and second ends;
a handle attached to one of the first and second ends;
a nail magazine articulatably connected to said body, said nail magazine being configured to receive a nail coil, said nail magazine including an upper part and a lower part, the upper part including a plurality of recesses;
a plurality of magnets disposed in the plurality of recesses of the upper part of said nail magazine;
a nail guide connected to said magazine, configured to receive nails from the nail coil;
a hammerhead in communication with said nail guide, said hammerhead including a drive channel configured to receive nails from said nail guide; and
a striker connected to said body, said striker including first and second ends, said striker adapted to move through the drive channel such that the first end strikes the nails received from said nail guide.

2. The nailing device of claim 1 wherein said plurality of permanent magnets are evenly spaced and disposed along a periphery of the upper part of said nail magazine.

3. The nailing device of claim 1 wherein the upper part of said nail magazine includes a fixing plate having at least first and second layers, where the first layer of the fixing plate opposes nail heads of the nail coil.

4. The nailing device of claim 3 wherein the first layer comprises non-magnetizable steel.

5. The nailing device of claim 4 wherein the first layer comprises austentite.

6. The nailing device of claim 4 wherein the second layer comprises polyamide, the recesses being formed in the second layer such that the plurality of magnets rest directly on the first layer.

7. The nailing device of claim 4 wherein the plurality of magnets disposed in the nail magazine comprise a neodymium-iron-boron alloy.

8. The nailing device of claim 4 wherein the plurality of magnets disposed in the nail magazine have a holding power of between 10 N/mm$^2$ and 30 N/mm$^2$.

9. The nailing device of claim 4 wherein the plurality of magnets disposed in the said nail magazine are cylindrical and have a diameter of between 5 mm and 15 mm and have a height of between 1 mm and 3 mm.

10. The nailing device of claim 4 further comprising a magnet attached to said striker proximate to the first end.

11. A nail magazine for use with a nail coil, said nailing device comprising:
a generally cylindrical housing configured to house a nail coil, said housing including an upper part and a lower part, the upper part comprising a fixing plate having at least first and second layers, the first layer opposing nail heads of the nail coil, the second layer of the fixing plate including one or more recesses in which one or more magnets are disposed such that the magnets rest directly on the first layer.

12. The nail magazine of claim 11 wherein the first layer consists of a non-magnetizable steel.

13. The nail magazine of claim 11 wherein the second layer comprises a synthetic material.

14. The nail magazine of claim 13 wherein the synthetic material is polyamide.

15. The nail magazine of claim 11 wherein the one or more magnets disposed in the nail magazine has a holding power of between 10 N/mm$^2$ and 30 N/mm$^2$.

16. The nail magazine of claim 11 wherein the one or more magnets are cylindrical and have a diameter of between 5 mm and 15 mm and have a height of between 1 mm and 3 mm.

* * * * *